United States Patent [19]

Tsutsumi et al.

[11] Patent Number: 6,139,949
[45] Date of Patent: Oct. 31, 2000

[54] MAGNETO OPTICAL RECORDING MEDIUM

[75] Inventors: Kazuhiko Tsutsumi; Tatsuya Fukami, both of Amagasaki, Japan

[73] Assignee: Mitsubishi Denki Kabushiki Kaisha, Tokyo, Japan

[21] Appl. No.: 08/052,222

[22] Filed: Apr. 22, 1993

Related U.S. Application Data

[63] Continuation of application No. 07/475,152, Feb. 5, 1990, abandoned.

[30] Foreign Application Priority Data

Feb. 10, 1989 [JP] Japan ................................. 1-32116

[51] Int. Cl.$^7$ ....................................................... G11B 5/66
[52] U.S. Cl. .................. 428/332; 428/336; 428/694 ML; 428/694 SC; 428/694 MT; 428/694 RL; 428/900; 369/13; 369/275.2; 369/283; 365/122
[58] Field of Search ........................... 428/900, 694 ML, 428/694 SC, 694 MT, 694 RL, 332, 336; 369/13, 283, 275.2; 365/122

[56] References Cited

U.S. PATENT DOCUMENTS

| | | | |
|---|---|---|---|
| 4,579,777 | 4/1986 | Honguu et al. | 428/336 |
| 4,675,767 | 6/1987 | Osato et al. | 360/131 |
| 4,878,132 | 10/1989 | Aratani et al. | 360/59 |
| 4,995,024 | 2/1991 | Arimune et al. | 369/13 |

FOREIGN PATENT DOCUMENTS

| | | |
|---|---|---|
| 0139474 | 5/1984 | European Pat. Off. . |
| 125881 | 11/1984 | European Pat. Off. . |
| 139474 | 5/1985 | European Pat. Off. . |

(List continued on next page.)

OTHER PUBLICATIONS

"Overwriting Characteristics of Magneto–Optical Disk by Magnetic Field Modulation Recording Method", Materials for Meeting for Study of Electricity, Magnetics Research, MAG 86–95, Sep. 17, 1986, pp. 53–64.

Effects of annealing Atmosphere on Magneto–Optical Properties of Sputtered Bi–Substituted Garnet Films, Kobayashi, et al., IEEE Translation Journal on Magnetics in Japan, vol. 3, No. 6, Jun. 1988, pp. 491–492.

Write–Read Characteristics of Bi–Substituted Garnet Magneto–Optical Disc, Hayakawa, et al., IEEE Translation Journal on Magnetics in Japan, vol. 3, No. 6, Jun. 1988, pp. 487–488.

The Overwriting Characteristics of Magneto–Optical Disk by Magnetic Field Modulation Method (Invited)—IEEE Transactions on Magnetics, vol. MAG–23, No. 5, Sep. 1987, pp. 2695–2698.

High Speed Overwriteable Magneto–Optic Recording—Proc. Int. Symp. on Optical Memory, 1987, Japanese Journal of Applied Physics, Vo. 26 (1987), Supplement 26–4, pp. 149–154.

Magnetics Research MAG–87–173–180, —Japanese Electrotechnical Committee, Nov. 24, 1987.

Magnetic Properties of Amorphous GdTbCo Film: Journal of Magnetic Materials 31–34 (1983).

Magnetic Properties and Microstructure in Ho–Co Alloy Thin Films Fabricated by Rf Sputtering Technique: ICMFS 1982.

Magnetic Materials For Optical Recording: Applied Optics, vol. 13, No. 4 (Apr. 1974).

(List continued on next page.)

*Primary Examiner*—Leszek Kiliman
*Attorney, Agent, or Firm*—Leydig, Voit & Mayer, Ltd.

[57] ABSTRACT

A magneto-optical recording medium in which information can be overwritten by a magnetic field modulation method, is provided with a magnetic thin film satisfying an inequality $t \times M_s < 5$ μm·emu/cc wherein the film thickness is, represented by $t$ μm and the saturating magnetization is represented by $M_s$ emu/cc. Even in the case where the intensity of the modulated magnetic field applied to the magneto-optical recording medium is small, a carrier to noise ratio C/N of not. less than a predetermined value and a jitter of not more than a predetermined value can be realized.

24 Claims, 3 Drawing Sheets

FOREIGN PATENT DOCUMENTS

| | | |
|---|---|---|
| 0161807 | 11/1985 | European Pat. Off. . |
| 161807 | 11/1985 | European Pat. Off. . |
| 192256 | 8/1986 | European Pat. Off. . |
| 0279581 | 8/1988 | European Pat. Off. . |
| 279581 | 8/1988 | European Pat. Off. . |
| 350010 | 1/1990 | European Pat. Off. . |
| 3335689 | 4/1984 | Germany . |
| 74852 | 11/1982 | Japan . |
| 73746 | 5/1983 | Japan . |
| 125251 | 7/1983 | Japan . |
| 148161 | 8/1984 | Japan . |
| 160164 | 9/1984 | Japan . |
| 029956 | 2/1985 | Japan . |
| 28049 | 2/1985 | Japan . |
| 129951 | 7/1985 | Japan . |
| 3500314 | 7/1985 | Japan . |
| 209947 | 10/1985 | Japan . |
| 247844 | 12/1985 | Japan . |
| 182649 | 8/1986 | Japan . |
| 194664 | 8/1986 | Japan . |
| 63-317994 | 12/1988 | Japan .............................. G11B 11/10 |
| 166349 | 6/1989 | Japan . |
| 211253 | 8/1989 | Japan . |
| 2071696 | 9/1981 | United Kingdom . |
| 2136647 | 9/1984 | United Kingdom . |

OTHER PUBLICATIONS

Magneto–Optic Properties in R.F. Sputtered Co–Cr Films: IEEE Transactions on Magnetics, vol. Mag–19, No. 5 (Sep. 1983).

Bias Voltage Dependence of Oxidation in Sputtered GdCo Amorphous Films: 4th Int. Conf. on Rapidly Quenched Metals (1981).

Magnetooptical Kerr Effect Spectra of Amorphous Gadolinium–Cobalt Films: Physica Status Solid (a) (1976).

RF–Sputter Epitaxy of Highly Bi–Substituted Garnet Films For Magneto–Optical Applications: The Magnetics Society of Japan 1987.

Growth and Characterization of Garnet Thin Fils For Magnetooptical Readout: The Magnetic Society of Japan (1987).

Oxide Films For Magneto–Optical Applications: The Magnetic Society of Japan (1987).

MAGNETO OPTICAL RECORDING MEDIUM

This application is a continuation of application Ser. No. 07/475,152, filed Feb. 5, 1990 now abandoned.

BACKGROUND OF THE INVENTION

1. Field of the Invention

The present invention relates to a magneto-optical recording medium in which information can be overwritten by the magnetic field modulation method.

2. Description of Related Art

Various proposals have been made to overwrite information onto a magneto-optical recording medium (hereinafter referred to as a recording medium) by the magnetic field modulation method. In overwriting information by the magnetic field modulation method, a laser beam of constant light intensity is projected onto the recording medium and a modulated magnetic field of a predetermined intensity is applied to the position of the recording medium onto which light is projected, whereby the information already recorded in the recording medium is erased and at. the same time fresh information is stored therein. The result of a research of the magneto-optical recording by the magnetic field modulation method mentioned above has been disclosed, for example, in "Magnetics Research MAG-87-173-180", published by a corporate juridical person: Japanese Electrotechnical Committee in Nov. 24, 1987.

Meanwhile, in or der to write information into the recording medium with high density, it is necessary to raise the modulation frequency of a magnetic head applying the modulated magnetic field. Besides, it is also required to increase the distance between the magnetic head and the recording medium in view of irregularity in thickness and warping of the recording medium.

If the modulation frequency is raised, however, the intensity of the magnetic field generated by the magnetic head is reduced. Moreover, because of the high speed rotation of the recording medium, the intensity of the modulated magnetic field applied to the recording medium is unable to keep up with the modulated magnetic field of the magnetic head, which results in the deterioration of the intensity of the modulated magnetic field applied to the recording medium. The intensity of the modulated magnetic field applied to the recording medium is further deteriorated also due to the increased distance between the magnetic head and the recording medium.

Accordingly, it is required to make the intensity of the modulated magnetic field of the magnetic head not less than 200 Oe for the purpose of recording information in the recording medium in a sufficient recording state. The reason for this is considered to reside in the fact that the floating magnetic field generated by the recording medium itself opposes or repels the modulated magnetic field applied from the magnetic head.

Wherever in this specification reference is made to various media parameters, such as magnetization $M_s$ and coercive $H_C$, it will be understood by those skilled in the art that the values are those determined at room temperature, unless otherwise indicated.

SUMMARY OF THE INVENTION

The present invention is intended to solve the above-described problems inherent in the prior art, the principle of which will he discussed hereinbelow.

The inventors of the present invention have confirmed by experiments the influences of the floating magnetic field generated by the recording medium itself, holding the intensity of the modulated magnetic field applied to the recording medium not less than 200 Oe so as to realize sufficient recording state. The inventors have found that the floating magnetic field from the recording medium changes in proportion to the product of the thickness of an information recording film of the recording medium, that is, the thickness t of a magnetic thin film, and the saturating magnetization $M_s$ of the magnetic thin film.

The relation between the jitter σ representing the time lag between a recording signal and a regenerating signal, and C/N (carrier to noise ratio) when information is recorded in the recording medium is as shown in the graph of FIG. 1. In FIG. 1, the vertical axis indicates the jitter σ (nsec), while the horizontal axis indicates the C/N (dB). As is clear from FIG. 1, when the jitter σ is not less than 3.5 nsec, the C/N becomes 45 dB or less, and therefore the information cannot be recorded in a satisfactory recording state.

On the other hand, when the intensity of the modulated magnetic field applied to the recording medium is set at 200 Oe, and the relation between C/N and the product of the film thickness t and the saturating magnetization $M_s$ was obtained, the result is as shown in FIG. 2 wherein the vertical axis represents C/N (dB) and the horizontal axis represents $t \times M_s$ (μm·emu/cc). The graph in FIG. 2 makes it clear that the C/N becomes higher as the multiplied value $t \times M_s$ declines. When the product of the film thickness t and the saturating magnetization $M_s$ is not more than 5 μm·emu/cc, the C/N becomes 45 dB or more. In contrast, when the multiplied value is not less than 5 μm·emu/cc, the C/N is reduced to 45 dB or less, and therefore the information cannot be recorded in a satisfactory recording state as mentioned earlier. In other words, in order to record the information in a satisfactory state in the recording medium, the product of the film thickness L (μm) of the magnetic thin film of the recording medium and the saturating magnetization $M_s$ (emu/cc) should be less than 5 μm·emu/cc.

As is described above, if an inequality $t \times M_s < 5$ is fulfilled, when the information is recorded with an intensity 200 Oe of the modulated magnetic field applied to the recording medium, the C/N, and the jitter σ are in ranges for satisfactory recording and reproduction of information. Accordingly, the magneto-optical recording medium of the present invention for directly overwriting information recorded in the medium with a modulated magnetic field includes a magnetic thin film consisting essentially of a TbFeCo alloy and having a thickness t a saturating magnetization $M_s$ wherein $t \times M_s < 5$ μm·emu/cc. A method of directly overwriting recorded information recorded in a magneto-optical recording medium includes recording information in a magneto-optical recording medium comprising a magnetic film consisting essentially of a TbFeCo alloy having a thickness t and a saturation magnetization $M_s$, wherein $t \times M_s < 5$ μm·emu/cc, by heating a portion of the magnetic film with light to an elevated temperature, and, simultaneously, applying a modulated magnetic field to the portion, thereby directly overwriting any information previously recorded at the portion.

It is hence a primary object of the present invention to provide a magneto-optical recording medium, in which information can be overwritten even in a the modulated magnetic field of small intensity (not more than 200 Oe).

It is another object of the present invention to provide a magneto-optical recording medium having a small error rate in recording.

It is a still further object of the present invention to provide a magneto-optical recording medium which does not require an increase in the intensity of the modulated magnetic field in recording information in a satisfactory recording state.

The above and further objects and features of the invention will more fully be apparent from the following detailed description with accompanying drawings.

DESCRIPTION OF THE PREFERRED EMBODIMENTS

EXAMPLE 1

Figure 1:
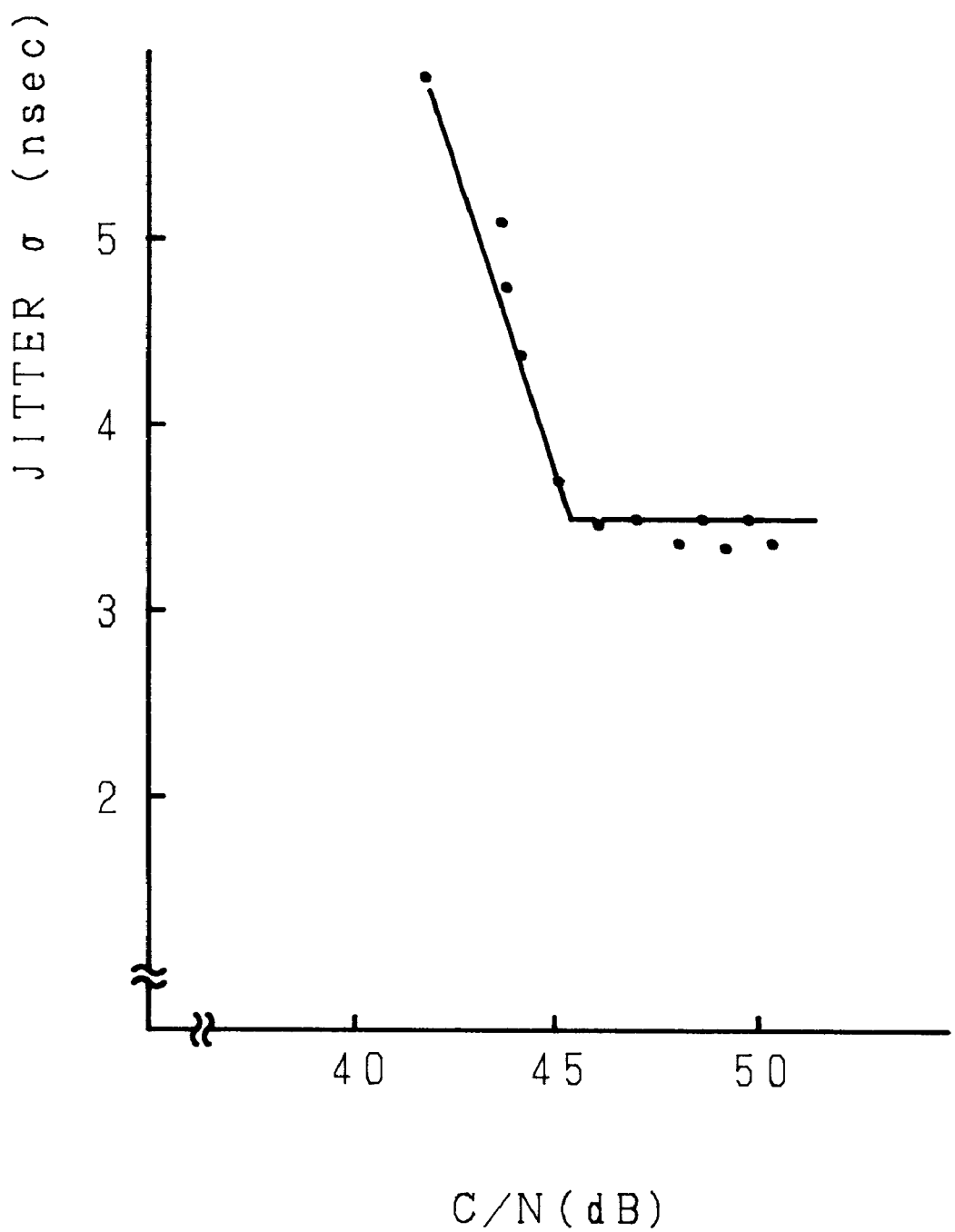
FIG. 1 is a graph showing the relation between the jitter σ and the C/N.
Figure 2:
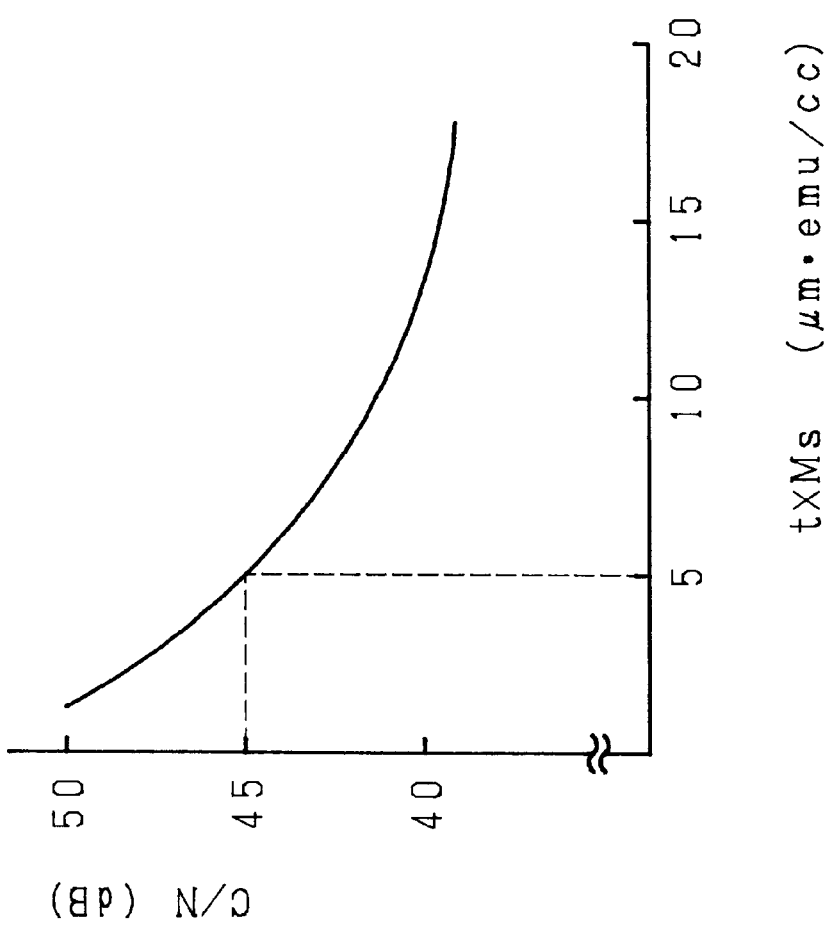
FIG. 2 is a graph showing the relation between the C/N and, the product ($t \times M_s$) of the film thickness t of a magnetic thin film and the saturating magnetization $M_s$.
Figure 3:
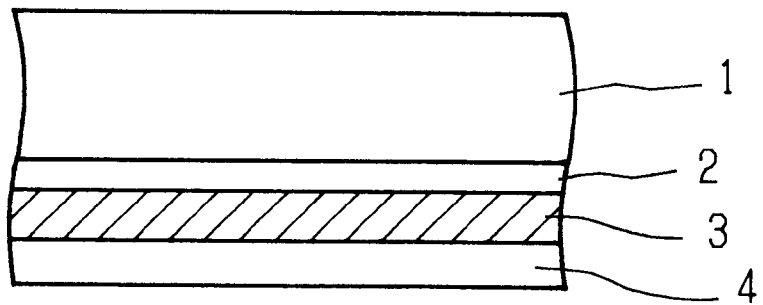
FIGS. 3, 4, 5 are respectively a schematic sectional view showing a recording medium according to a first, a second and a third embodiments of the present invention.

FIG. 3 is a schematic sectional view showing a recording medium according to a first embodiment of the present invention. In the recording medium of FIG. 3, on one surface of a substrate 1, which is a polycarbonate substrate or a 2P glass substrate is formed a dielectric film 2 made of SiN 0.06 μm in thickness, and on the dielectric film 2 is formed a magnetic thin film 3 made of TbFeCo having a film thickness t of 0.08 μm, with the saturating magnetization $M_s$ of 60 emu/cc. On the magnetic thin film 3 is formed a protective film 4 made of SiN 0.08 μm in thickness. Each of these thin films 2, 3 and 4 is formed by sputtering. The product of the film thickness t and the saturating magnetization $M_s$ is 4.8 μm·emu/cc according to this embodiment.

When the recording medium (S1) of the above-described structure is recorded with information on condition of a recording signal frequency F=7.4 MHz, and a rotational speed of the recording medium N=3600 r.p.m., and the intensity of the modulated magnetic field is 200 Oe, the C/N and jitter σ are found to be 46.0 dB and 3.58 nsec, respectively. Moreover, other recording mediums (S2, S3) in the same structure as S1, but having a different film thickness t of the magnetic thin film 3 and a different saturating magnetization $M_s$ were prepared to measure the C/N and jitter σ. The recording medium S2 having the film thickness t of 0.10 μm and saturating magnetization $M_s$ of 50 emu/cc shows a C/N of 45.0 dB and a jitter σ of 3.80 nsec. The recording medium S3 having the film thickness t of 0.08 μm and saturating magnetization $M_s$ of 30 emu/cc shows a C/N of 48.0 dB and a jitter σ of 3.50 nsec. The results of the experiments are shown in table 1 below.

In the meantime, when conventional recording mediums SS1 and SS2, which have the same structure as the above recording mediums S1, S2 and S3, and with the product of the film thickness t of the magnetic thin film 3 with the saturating magnetization $M_s$ being 5 or more, are measured, the results are also shown in Table 1. In any of the conventional recording mediums, the C/N is not more than 45 dB and the jitter σ is not less than 5.0 nsec.

TABLE 1

|  | t | $M_s$ | t × $M_s$ | C/N | σ |
|---|---|---|---|---|---|
| S1 | 0.08 | 60 | 4.8 | 46.0 | 3.58 |
| S2 | 0.10 | 50 | 5.0 | 45.0 | 3.80 |
| S3 | 0.08 | 30 | 2.4 | 48.0 | 3.50 |
| SS1 | 0.10 | 92 | 9.2 | 42.0 | 5.80 |
| SS2 | 0.07 | 100 | 7.0 | 43.5 | 5.20 |

As is clear from the foregoing experiments, since the product multiplied value of the film thickness t of the magnetic thin film and the saturating magnetization $M_s$ is restricted to be less than 5 μm·emu/cc in the recording medium, the C/N becomes 45.0 dB or more and the jitter σ is not more than 4 nsec, even when the intensity of the modulated magnetic field of the recording medium is 200 Oe. Accordingly, a recording medium with reduced error rate, with a which information can be overwritten in small intensity modulated magnetic field in a high-speed rotation, can be obtained.

EXAMPLE 2

Figure 4:
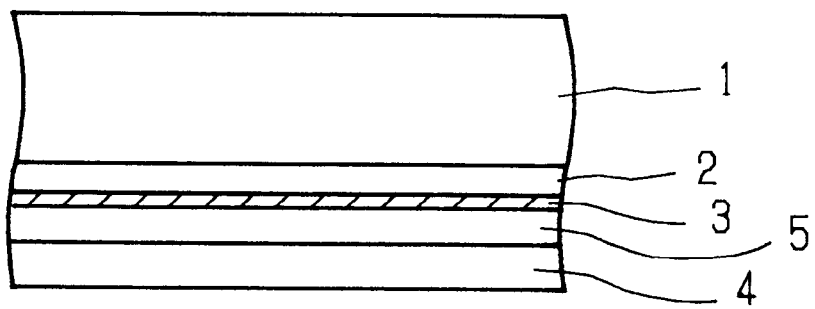

FIG. 4 is a schematic sectional view showing a recording medium according to a second embodiment of the present invention. A dielectric film 2 made of SiN is formed 0.06 μm in thickness on one surface. of a substrate 1, which is a polycarbonate substrate or a 2P glass substrate, onto which film 2 is formed a magnetic thin film 3 made of TbFeCo 0.03 μm in thickness with a saturating magnetization $M_s$ of 100 emu/cc. Further, a reflecting film 5 made of AlNi is formed 0.04 μm in thickness on the magnetic thin film 3. Moreover, a protective film 4 is formed on the reflecting film 5, and is made of SiN 0.08 μm in thickness. The magnetic thin film 3 may be DyFeCo, GdTbFe, GdTbFeCo, BiYIG or BiDy-Garnet, instead of TbFeCo.

Information a re recorded in the recording mediums (S4, S5) of the above structure under the same recording conditions as those for the recording mediums S1, S2 and S3, to measure the C/N and the jitter σ. A TbFeCo film is used for the magnetic thin film 3. A conventional recording medium SS3 with a product of 6 μm·emu/cc is prepared for comparison of the C/N and the jitter σ with those of the recording mediums S4 and S5. The results of the measurements are tabulated in Table 2 below.

TABLE 2

|  | t | $M_s$ | t × $M_s$ | C/N | σ |
|---|---|---|---|---|---|
| S4 | 0.03 | 100 | 3.0 | 47.2 | 3.59 |
| S5 | 0.03 | 50 | 1.5 | 49.0 | 3.46 |
| SS3 | 0.04 | 150 | 6.0 | 44.2 | 4.40 |

As is known from Table 2, even where the magnetic film 3 is made of TbFeCo 0.03 μm in thickness, approximately ⅓ of the film thickness t of the recording mediums S1, S2 and S3, the recording mediums S4 and S5 having the product of the film thickness t and the saturating magnetization $M_s$ of less than 5 μm·emu/cc represent the C/N exceeding 45 dB and the jitter a not more than 4.0 nsec. Meanwhile, the conventional recording medium SS3 having the product of 6 μm·emu/cc shows a C/N of 44.2 dB and a jitter σ of 4.4 nsec. Therefore, according to this embodiment, even when the magnetic thin film 3 is thin, if the product of the film thickness t and the saturating magnetization $M_s$ is less than 5 μm·emu/cc, a recording medium with a reduced error rate, with which information can be overwritten in a small intensity modulated magnetic field even at high-speed rotation, can be obtained.

EXAMPLE 3

Figure 5:
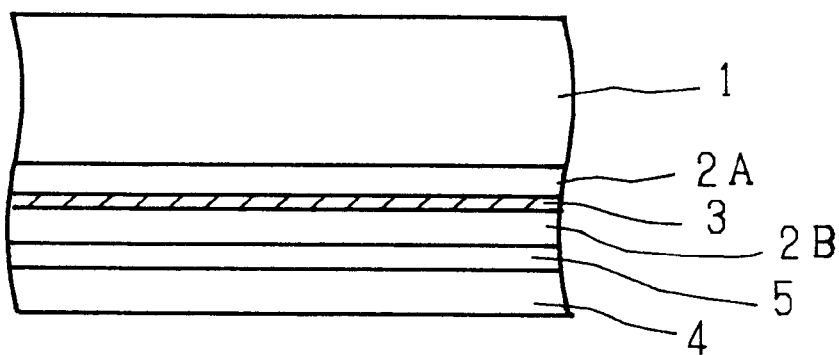

Referring to FIG. 5 schematically showing a section of a recording medium according to a third embodiment of the present invention, a first dielectric film 2A made of SiN 0.06 μm in thickness is formed on one surface of a substrate 1 which is similar to the substrate in the Examples 1 and 2 described earlier. On the first dielectric thin film 2A is formed a magnetic thin film 3 made of, for example, TbFeCo, with a film thickness t of 0.03 μm and a saturating magnetization $M_s$ of 50 emu/cc. A second dielectric film 2B is formed on the magnetic thin film 3. The second dielectric film 2B is made of SiN and has a film thickness of 0.06 μm. A reflecting film 5 made of AlNi is formed, 0.04 μm thickness, on the second dielectric film 2B. Furthermore, on the reflecting film 5 is formed a protective film 4 made of SiN in 0.08 μm thickness.

Information are recorded in the recording mediums (S6, S7 and S8) of the above structure under the same recording conditions as in the Examples 1 and 2. Then, the C/N and the jitter σ are measured. A conventional recording medium SS4 is also prepared with the same structure as the recording mediums S6, S7 and S8, with the multiplied value 6.4 μm·emu/cc, to measure the C/N and the jitter σ. The results of the measurements are indicated in Table 3 below.

TABLE 3

|  | t | $M_s$ | t × $M_s$ | C/N | σ |
|---|---|---|---|---|---|
| S7 | 0.03 | 30 | 0.9 | 50.0 | 3.50 |
| S7 | 0.03 | 40 | 1.2 | 49.5 | 3.58 |
| S8 | 0.04 | 50 | 2.0 | 48.5 | 3.60 |
| SS4 | 0.04 | 160 | 6.4 | 43.8 | 4.80 |

Although the magnetic thin film 3 is as thin as 0.03 or 0.04 μm and the dielectric film 2B is interposed between the magnetic thin film 3 and the reflecting film 5 in the recording mediums S6, S7 and S8, since the multiplied value of the film thickness t and the saturating magnetization $M_s$ is less than 5 μm·emu/cc, all of the recording mediums S6, S7 and S8 show a C/N not less than 45 dB and a jitter σ not more than 4.0 nsec. On the contrary, the conventional recording medium SS4 having the same structure as the recording mediums S6, S7 and S8, but a product of 6.4 μm·emu/cc shows a C/N of not more than 45 dB and a jitter σ not less than 4 nsec. Accordingly, as is clear from the above results of the measurements, even in the recording medium having the dielectric film 2B interposed between the magnetic thin film 3 and the reflecting film 5, a recording medium with reduced error rate, in which information can be overwritten by a small intensity modulated magnetic field even at a high-speed rotation, can be obtained. It is to be noted here that the recording medium with the dielectric film 2B interposed between the magnetic thin film 3 and the reflecting film 5 increases the Kerr rotational angle, $\theta_k$.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds are therefore intended to be embraced by the claims.

What is claimed is:

1. A magneto-optical recording medium for directly overwriting, with a modulated magnetic field, information recorded in the medium, comprising a magnetic film consisting essentially of a TbFeCo alloy having a thickness t and a saturating magnetization $M_s$, and wherein t×M<5 μm·emu/cc.

2. The magneto-optical recording medium as set forth in claim 1, wherein said magnetic film is magnetically anisotropic in a thickness direction.

3. The magneto-optical recording medium as set forth in claim 1, further comprising a substrate on which said magnetic film is located.

4. The magneto-optical recording medium as set forth in claim 3, wherein said substrate is a polycarbonate substrate or a 2P glass substrate.

5. A magneto-optical recording medium for directly overwriting, with a modulated magnetic field, information recorded in the medium, comprising:
   a substrate;
   a dielectric film on said substrate;
   a magnetic film consisting essentially of a TbFeCo alloy laminated on said dielectric film, having a thickness t and a saturating magnetization $M_s$ and wherein t×$M_s$<5 μm·emu/cc.

6. A magneto-optical recording medium for directly overwriting, with a modulated magnetic field, information recorded in the medium, comprising:
   a substrate;
   a dielectric film on said substrate;
   a magnetic film consisting essentially of a TbFeCo alloy laminated on said dielectric film, having a thickness t and a saturating magnetization $M_s$ and wherein t×$M_s$<5 μm·emu/cc;
   a reflecting film laminated on said magnetic film; and
   a protective film laminated on said reflecting film.

7. The magneto-optical recording medium as set forth in claim 6, wherein said dielectric film and said protective film are, respectively, SiN films, and said reflecting film is an AlNi film.

8. A magneto-optical recording medium for directly overwriting, with a modulated magnetic field, information recorded in the medium with a modulated magnetic field, comprising:
   a substrate;
   a first dielectric film on said substrate;
   a magnetic film consisting essentially of a TbFeCo alloy laminated on said dielectric film, having a thickness t and a saturating magnetization $M_s$ and wherein t×$M_s$<5 μm·emu/cc;
   a second dielectric film laminated on said magnetic film;
   a reflecting film laminated on said second dielectric film; and
   a protective film laminated on said reflecting film.

9. The magneto-optical recording medium as set forth in claim 8, wherein each of said first and second dielectric films and said protective film are, respectively, SiN films, and said reflecting film is an AlNi film.

10. The magneto-optical recording medium as set forth in claim 5, further comprising a protective film on said magnetic film.

11. The magneto-optical recording medium as set forth in claim 10, wherein said dielectric film and said protective film are, respectively, SiN films.

12. The magneto-optical recording medium as set forth in claim 1, wherein t is less than 0.10 μm.

13. The magneto-optical recording medium as set forth in claim 5, wherein t is less than 0.10 μm.

14. The magneto-optical recording medium as set forth in claim 6, wherein t is less than 0.10 μm.

15. The magneto-optical recording medium as set forth in claim 8, wherein t is less than 0.10 μm.

16. A method of directly overwriting recorded information recorded in a magneto-optical recording medium including recording information in a magneto-optical medium comprising a magnetic film consisting essentially of a TbFeCo alloy having a thickness t and a saturation magnetization $M_s$, wherein $t \times M_s < 5$ μm·emu/cc, by heating a portion of the magnetic film with light to an elevated temperature and, simultaneously, applying a modulated magnetic field to the portion, thereby directly overwriting any information previously recorded at the portion.

17. The method as set forth in claim 16, wherein said magnetic film has a thickness less than 0.10 μm.

18. The method as set forth in claim 16, wherein said magneto-optical recording medium comprises a substrate and a first dielectric film on said substrate, said magnetic film being disposed on said dielectric film.

19. The method as set forth in claim 18, wherein said magneto-optical recording medium further comprises a protective film on said magnetic film.

20. The method as set forth in claim 19, wherein said first dielectric film and said protective film are, respectively, SiN films.

21. The method as set forth in claim 18, wherein said magneto-optical recording medium further comprises a reflecting film laminated on said magnetic film and a protective film laminated on said reflecting film.

22. The method as set forth in claim 21, wherein said first dielectric film and said protective film are, respectively, SiN films, and said reflecting film is an AlNi film.

23. The method as set forth in claim 18, wherein said magneto-optical recording medium further comprises a second dielectric film laminated on said magnetic film, a reflecting film laminated on said second dielectric film, and a protective film laminated on said reflecting film.

24. The method as set forth in claim 23, wherein said first and second dielectric films and said protective film are, respectively, SiN films, and said reflecting film is an AlNi film.

\* \* \* \* \*

UNITED STATES PATENT AND TRADEMARK OFFICE
CERTIFICATE OF CORRECTION

PATENT NO. : 6,139,949
DATED : October 31, 2000
INVENTOR(S) : TSUTSUMI et al.

It is certified that an error appears in the above-identified patent and that said Letters Patent is hereby corrected as shown below:

Claim 1, Line 7, change "txM<5" to --txMs<5--.

Signed and Sealed this

Twenty-second Day of May, 2001

Attest:

NICHOLAS P. GODICI

Attesting Officer

Acting Director of the United States Patent and Trademark Office